United States Patent
Bhaskar et al.

(10) Patent No.: US 11,776,248 B2
(45) Date of Patent: Oct. 3, 2023

(54) SYSTEMS AND METHODS FOR AUTOMATED DOCUMENT IMAGE ORIENTATION CORRECTION

(71) Applicant: Optum, Inc., Minnetonka, MN (US)

(72) Inventors: Rahul Bhaskar, Rancho Santa Margarita, CA (US); Daryl Seiichi Furuyama, Irvine, CA (US); Daniel William James, Costa Mesa, CA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/047,045

(22) Filed: Oct. 17, 2022

(65) Prior Publication Data
US 2023/0135212 A1 May 4, 2023

Related U.S. Application Data

(63) Continuation of application No. 16/935,880, filed on Jul. 22, 2020, now Pat. No. 11,495,014.

(51) Int. Cl.
*G06V 10/98* (2022.01)
*G06N 20/00* (2019.01)
(Continued)

(52) U.S. Cl.
CPC ............. *G06V 10/98* (2022.01); *G06F 18/21* (2023.01); *G06F 18/217* (2023.01); *G06F 18/28* (2023.01);
(Continued)

(58) Field of Classification Search
CPC ...... G06V 10/98; G06V 10/242; G06V 30/40; G06V 30/10; G06V 2201/10; G06F 18/21; G06F 18/217; G06F 18/28; G06N 20/00
See application file for complete search history.

(56) References Cited

U.S. PATENT DOCUMENTS 7,768,676 B2 8/2010 Kimura et al.
8,224,131 B2 7/2012 Maekawa
(Continued)

FOREIGN PATENT DOCUMENTS

WO 2007/082534 A1 7/2007

OTHER PUBLICATIONS

Bassil, Youssef et al. "OCR Context-Sensitive Error Correction Based On Google Web 1T 5-Gram Data Set," American Journal of Scientific Research, Issue 50, Feb. 2012, ISSN 1450-223X.
(Continued)

*Primary Examiner* — Wesley J Tucker
(74) *Attorney, Agent, or Firm* — Alston & Bird LLP

(57) ABSTRACT

Systems and methods are configured for correcting the orientation of an image data object subject to optical character recognition (OCR) by receiving an original image data object, generating initial machine readable text for the original image data object via OCR, generating an initial quality score for the initial machine readable text via machine-learning models, determining whether the initial quality score satisfies quality criteria, upon determining that the initial quality score does not satisfy the quality criteria, generating a plurality of rotated image data objects each comprising the original image data object rotated to a different rotational position, generating a rotated machine readable text data object for each of the plurality of rotated image data objects and generating a rotated quality score for each of the plurality of rotated machine readable text data objects, and determining that one of the plurality of rotated quality scores satisfies the quality criteria.

18 Claims, 8 Drawing Sheets

(51) Int. Cl.
*G06V 30/40* (2022.01)
*G06V 10/24* (2022.01)
*G06F 18/21* (2023.01)
*G06F 18/28* (2023.01)
*G06V 30/10* (2022.01)

(52) U.S. Cl.
CPC ........... *G06N 20/00* (2019.01); *G06V 10/242* (2022.01); *G06V 30/40* (2022.01); *G06V 30/10* (2022.01); *G06V 2201/10* (2022.01)

(56) References Cited

U.S. PATENT DOCUMENTS

| | | | |
|---|---|---|---|
| 8,340,430 B2 | 12/2012 | Campbell | |
| 8,643,741 B2 | 2/2014 | Brunner | |
| 9,025,877 B2 | 5/2015 | Pavani et al. | |
| 9,053,350 B1 | 6/2015 | Abdulkader et al. | |
| 9,110,926 B1 | 8/2015 | Natarajan et al. | |
| 10,402,944 B1 | 9/2019 | Pribble et al. | |
| 10,616,443 B1 * | 4/2020 | Lund | G06V 10/242 |
| 10,810,473 B1 * | 10/2020 | Joseph | G06K 13/14 |
| 11,393,597 B1 * | 7/2022 | Gandhi | G06K 7/1482 |
| 11,495,014 B2 * | 11/2022 | Bhaskar | G06F 18/217 |
| 2010/0149322 A1 | 6/2010 | Lev | |
| 2011/0258195 A1 | 10/2011 | Welling et al. | |
| 2011/0305393 A1 * | 12/2011 | Nijemcevic | G06V 30/1478 382/182 |
| 2017/0357869 A1 | 12/2017 | Shustorovich et al. | |
| 2019/0286935 A1 | 9/2019 | Becker et al. | |
| 2020/0005089 A1 | 1/2020 | Guruprasad et al. | |
| 2020/0184278 A1 * | 6/2020 | Zadeh | G06N 3/044 |
| 2021/0406576 A1 | 12/2021 | Whitestone et al. | |
| 2022/0121871 A1 * | 4/2022 | Peng | G06F 18/213 |

OTHER PUBLICATIONS

International Searching Authority, International Search Report and Written Opinion for International Application No. PCT/US2021/041769, dated Oct. 21, 2021, (16 pages), European Patent Office, Rijswijk, Netherlands.

Kundeti, Srinivasa Rao et al. "Clinical Named Entity Recognition: Challenges and Opportunities," 2016 IEEE International Conference On Big Data (Big Data), Dec. 5, 2016, pp. 1937-1945, XP033056588, DOI: 10.1109/BIGDATA.2016.7840814.

Nguyen, Thi-Tuyet-Hai et al. "Deep Statistical Analysis Of OCR Errors For Effective Post-OCR Processing," In 2019 ACM/IEEE Joint Conference on Digital Libraries (JCDL), Jun. 2, 2019, (10 pages). IEEE.

Saez, Daniel. "Correcting Image Orientation Using Convolutional Neural Networks—A Hands-On Introduction To Deep Learning Applications," Jan. 12, 2017, (20 pages), (Article, Online), [Retrieved from the Internet Jul. 23, 2020] <URL: https://d4nst.github.io/2017/01/12/image-orientation/>.

* cited by examiner

FIG. 8

SYSTEMS AND METHODS FOR AUTOMATED DOCUMENT IMAGE ORIENTATION CORRECTION

CROSS REFERENCE TO RELATED APPLICATIONS

This application is a continuation of U.S. application Ser. No. 16/935,880, filed Jul. 22, 2020, the contents of which is hereby incorporated by reference herein in its entirety.

BACKGROUND

Medical charts are documents that track a patient's medical history and care. One method to digitize these records is to scan these documents using an optical scanner and convert the image to machine readable text using an optical character recognition (OCR) technique. However, OCR processing accuracy may be significantly diminished by improperly oriented images as well as other problems associated with incorrect image creation.

Thus, a need exists for systems and methods for providing high accuracy OCR of imaged documents.

BRIEF SUMMARY

In general, embodiments of the present invention provide methods, apparatuses, systems, computing devices, computing entities, and/or the like for providing high-quality OCR processing on image data objects. Various embodiments are configured for performing image orientation analysis based at least in part on machine readable text metadata, and utilizing one or more of an OCR quality processor, a rotation analyzer, and/or an OCR engine.

Various embodiments are directed to a computer-implemented method for correcting an orientation of an image data object, the computer-implemented method comprising: receiving, by one or more processors, an original image data object; generating, by the one or more processors applying an optical character recognition (OCR) process, initial machine readable text for the original image data object; generating, by the one or more processors and using one or more machine learning models, an initial quality score for the initial machine readable text; determining whether the initial quality score satisfies one or more quality criteria; responsive to determining that the initial quality score does not satisfy the one or more quality criteria, generating a plurality of rotated image data objects each corresponding to a different rotational position, wherein each of the plurality of rotated image data objects comprise the original image data object rotated to a corresponding rotational position; generating, by the one or more processors, a rotated machine readable text data object for each of the plurality of rotated image data objects, wherein each of the rotated machine readable text data objects are stored in association with corresponding rotated image data objects; generating, by the one or more processors and using one or more machine learning models, a rotated quality score for each of the rotated machine readable text data objects; determining that a first rotated quality score of the rotated quality scores satisfies the one or more quality criteria, wherein the first rotated quality score corresponds to a first rotated machine readable text data object of the rotated machine readable text data objects; and providing the first rotated machine readable text data object to a natural language processing (NLP) engine.

In certain embodiments, generating an initial quality score comprises: identifying one or more words within the initial machine readable text based at least in part on a machine-learning model for identifying spaces between words; comparing each of the one or more words identified within the initial machine readable text against words within a dictionary retrieved for checking spelling within the initial machine readable text; generating a spelling error detection rate for the initial machine readable text; determining the initial quality score based at least in part on the spelling error detection rate for the initial machine readable text. In various embodiments, the method further comprises identifying, within metadata associated with the original image data object, a language associated with the original image data object; and retrieving the dictionary based at least in part on the language associated with the original image data object. In certain embodiments, generating a plurality of rotated image data objects comprises: generating a first rotated image data object comprising the original image data object rotated to a first rotational position; generating a second rotated image data object comprising the original image data object rotated to a second rotational position; generating a third rotated image data object comprising the original image data object rotated to a third rotational position; and storing each of the first rotated image data object, the second rotated image data object, and the third rotated image data object in association with the original image data object.

In various embodiments, generating an initial quality score for the initial machine readable text comprises: generating text metadata comprising text summarization metrics for the initial machine readable text; processing the text metadata using one or more machine learning models to generate the initial quality score and associating the initial quality score with the initial machine readable text. In various embodiments, the text summarization metrics comprise one or more of: a count of words not evaluated within the initial machine readable text; a count of words evaluated within the initial machine readable text; a count of words within the initial machine readable text not found in a dictionary; a count of words within the initial machine readable text found in the dictionary; a count of words within the initial machine readable text; or a count of space characters within the initial machine readable text.

Certain embodiments are directed to an apparatus for correcting an orientation of an image data object, the apparatus comprising at least one processor and at least one memory including program code, the at least one memory and the program code configured to, with the at least one processor, cause the apparatus to at least: receive an original image data object; generate, at least in part by applying an optical character recognition (OCR) process, initial machine readable text for the original image data object; generate, at least in part by using one or more machine learning models, an initial quality score for the initial machine readable text; determine whether the initial quality score satisfies one or more quality criteria; responsive to determining that the initial quality score does not satisfy the one or more quality criteria, generate a plurality of rotated image data objects each corresponding to a different rotational position, wherein each of the plurality of rotated image data objects comprise the original image data object rotated to a corresponding rotational position; generate a rotated machine readable text data object for each of the plurality of rotated image data objects, wherein each of the rotated machine readable text data objects are stored in association with corresponding rotated image data objects; generate, at least in part by using one or more machine learning models, a rotated quality score for each of the rotated machine readable text data objects; determine that a first rotated quality score of the rotated quality scores satisfies the one or more quality criteria, wherein the first rotated quality score corresponds to a first rotated machine readable text data object of the rotated machine readable text data objects; and provide the first rotated machine readable text data object to a natural language processing (NLP) engine.

In certain embodiments, generating an initial quality score comprises: identifying one or more words within the initial machine readable text based at least in part on a machine-learning model for identifying spaces between words; comparing each of the one or more words identified within the initial machine readable text against words within a dictionary retrieved for checking spelling within the initial machine readable text; generating a spelling error detection rate for the initial machine readable text; determining the initial quality score based at least in part on the spelling error detection rate for the initial machine readable text.

In various embodiments, the at least one memory and the program code is configured to, with the at least one processor, cause the apparatus to further: identify, within metadata associated with the original image data object, a language associated with the original image data object; and retrieve the dictionary based at least in part on the language associated with the original image data object. Moreover, in certain embodiments, generating a plurality of rotated image data objects comprises: generating a first rotated image data object comprising the original image data object rotated to a first rotational position; generating a second rotated image data object comprising the original image data object rotated to a second rotational position; generating a third rotated image data object comprising the original image data object rotated to a third rotational position; and storing each of the first rotated image data object, the second rotated image data object, and the third rotated image data object in association with the original image data object. In various embodiments, generating an initial quality score for the initial machine readable text comprises: generating text metadata comprising text summarization metrics for the initial machine readable text; processing the text metadata using one or more machine learning models to generate the initial quality score and associating the initial quality score with the initial machine readable text. In certain embodiments, the text summarization metrics comprise one or more of: a count of words not evaluated within the initial machine readable text; a count of words evaluated within the initial machine readable text; a count of words within the initial machine readable text not found in a dictionary; a count of words within the initial machine readable text found in the dictionary; a count of words within the initial machine readable text; or a count of space characters within the initial machine readable text.

Certain embodiments are directed to a computer program product for correcting an orientation of an image data object, the computer program product comprising at least one non-transitory computer-readable storage medium having computer-readable program code portions stored therein, the computer-readable program code portions configured to: receive an original image data object; generate, at least in part by applying an optical character recognition (OCR) process, initial machine readable text for the original image data object; generate, at least in part using one or more machine learning models, an initial quality score for the initial machine readable text; determine whether the initial quality score satisfies one or more quality criteria; responsive to determining that the initial quality score does not satisfy the one or more quality criteria, generate a plurality of rotated image data objects each corresponding to a different rotational position, wherein each of the plurality of rotated image data objects comprise the original image data object rotated to a corresponding rotational position; generate a rotated machine readable text data object for each of the plurality of rotated image data objects, wherein each of the rotated machine readable text data objects are stored in association with corresponding rotated image data objects; generate, at least in part by using one or more machine learning models, a rotated quality score for each of the rotated machine readable text data objects; determine that a first rotated quality score of the rotated quality scores satisfies the one or more quality criteria, wherein the first rotated quality score corresponds to a first rotated machine readable text data object of the rotated machine readable text data objects; and provide the first rotated machine readable text data object to a natural language processing (NLP) engine.

In various embodiments, generating an initial quality score comprises: identifying one or more words within the initial machine readable text based at least in part on a machine-learning model for identifying spaces between words; comparing each of the one or more words identified within the initial machine readable text against words within a dictionary retrieved for checking spelling within the initial machine readable text; generating a spelling error detection rate for the initial machine readable text; determining the initial quality score based at least in part on the spelling error detection rate for the initial machine readable text. In certain embodiments, the computer-readable program code portions are further configured to: identifying, within metadata associated with the original image data object, a language associated with the original image data object; and retrieving the dictionary based at least in part on the language associated with the original image data object.

In various embodiments, generating a plurality of rotated image data objects comprises: generating a first rotated image data object comprising the original image data object rotated to a first rotational position; generating a second rotated image data object comprising the original image data object rotated to a second rotational position; generating a third rotated image data object comprising the original image data object rotated to a third rotational position; and storing each of the first rotated image data object, the second rotated image data object, and the third rotated image data object in association with the original image data object. Moreover, generating an initial quality score for the initial machine readable text may comprise: generating text metadata comprising text summarization metrics for the initial machine readable text; processing the text metadata using one or more machine learning models to generate the initial quality score and associating the initial quality score with the initial machine readable text.

In certain embodiments, the text summarization metrics comprise one or more of: a count of words not evaluated within the initial machine readable text; a count of words evaluated within the initial machine readable text; a count of words within the initial machine readable text not found in the dictionary; a count of words within the initial machine readable text found in the dictionary; a count of words within the initial machine readable text; or a count of space characters within the initial machine readable text.

BRIEF DESCRIPTION OF THE DRAWINGS

Figure 1:
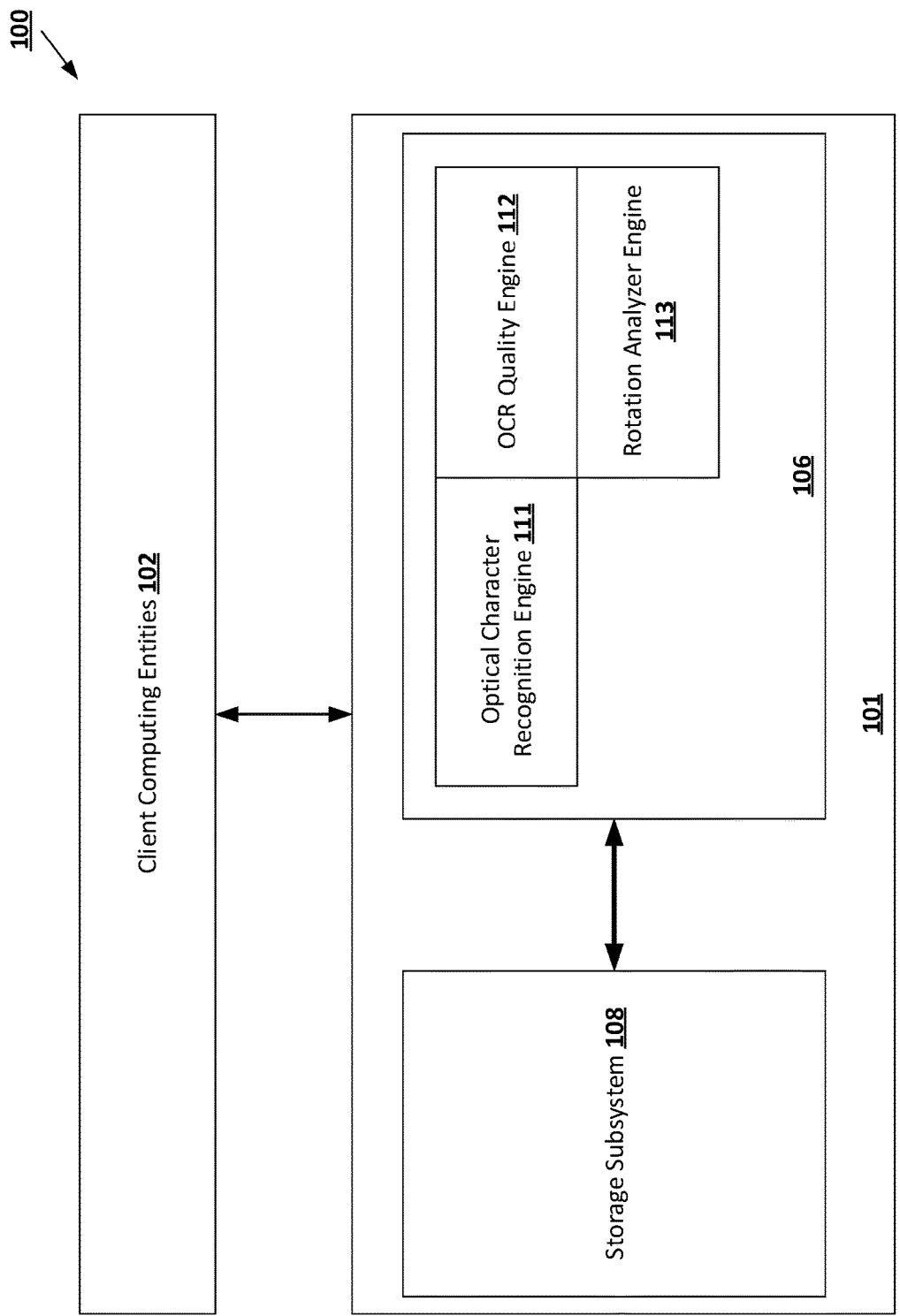

Having thus described the invention in general terms, reference will now be made to the accompanying drawings, which are not necessarily drawn to scale, and wherein:

FIG. 1 provides an exemplary overview of an architecture in accordance with certain embodiments.

Figure 2:
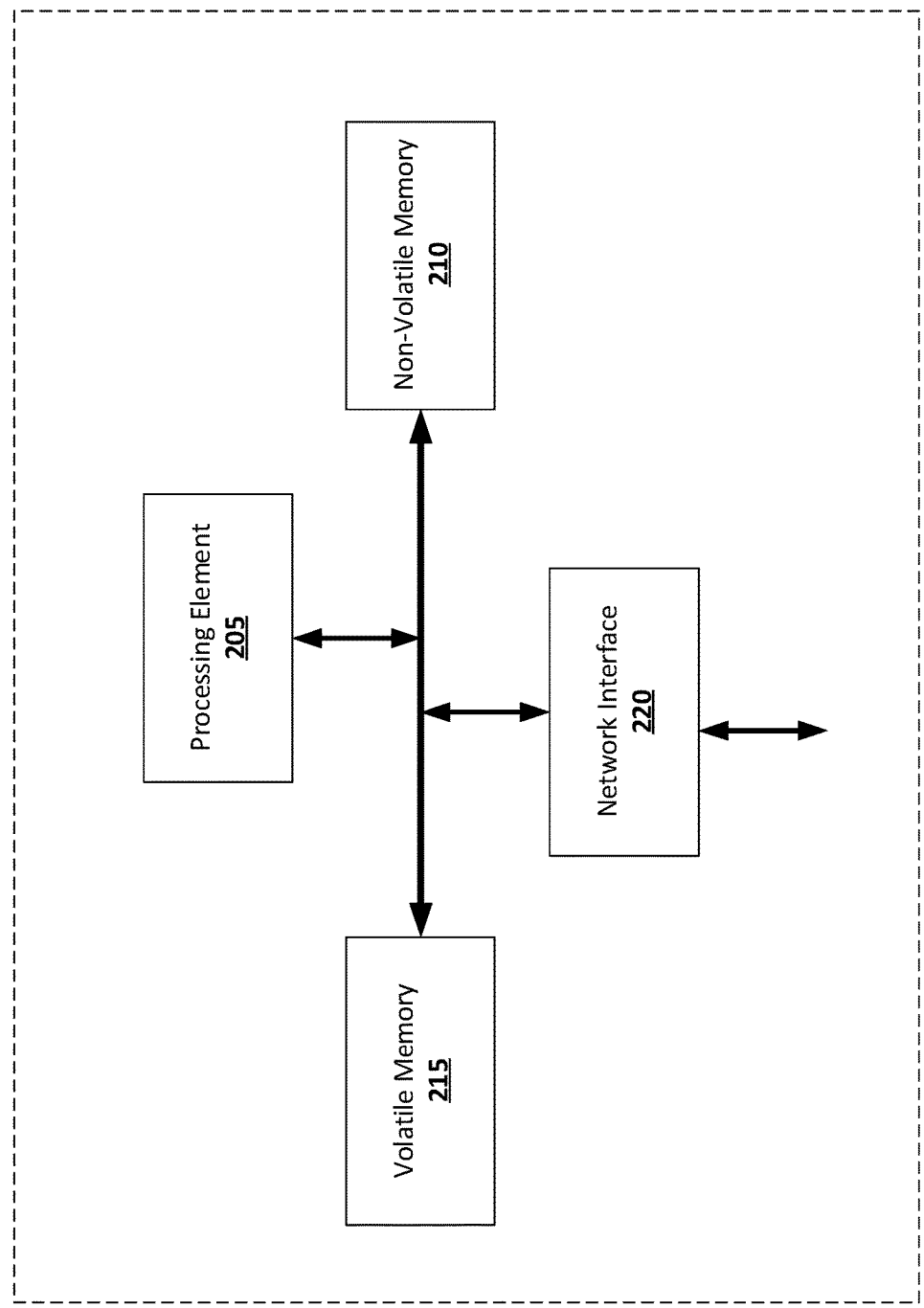

FIG. 2 provides an example image orientation analysis processing entity in accordance with some embodiments discussed herein.

Figure 3:
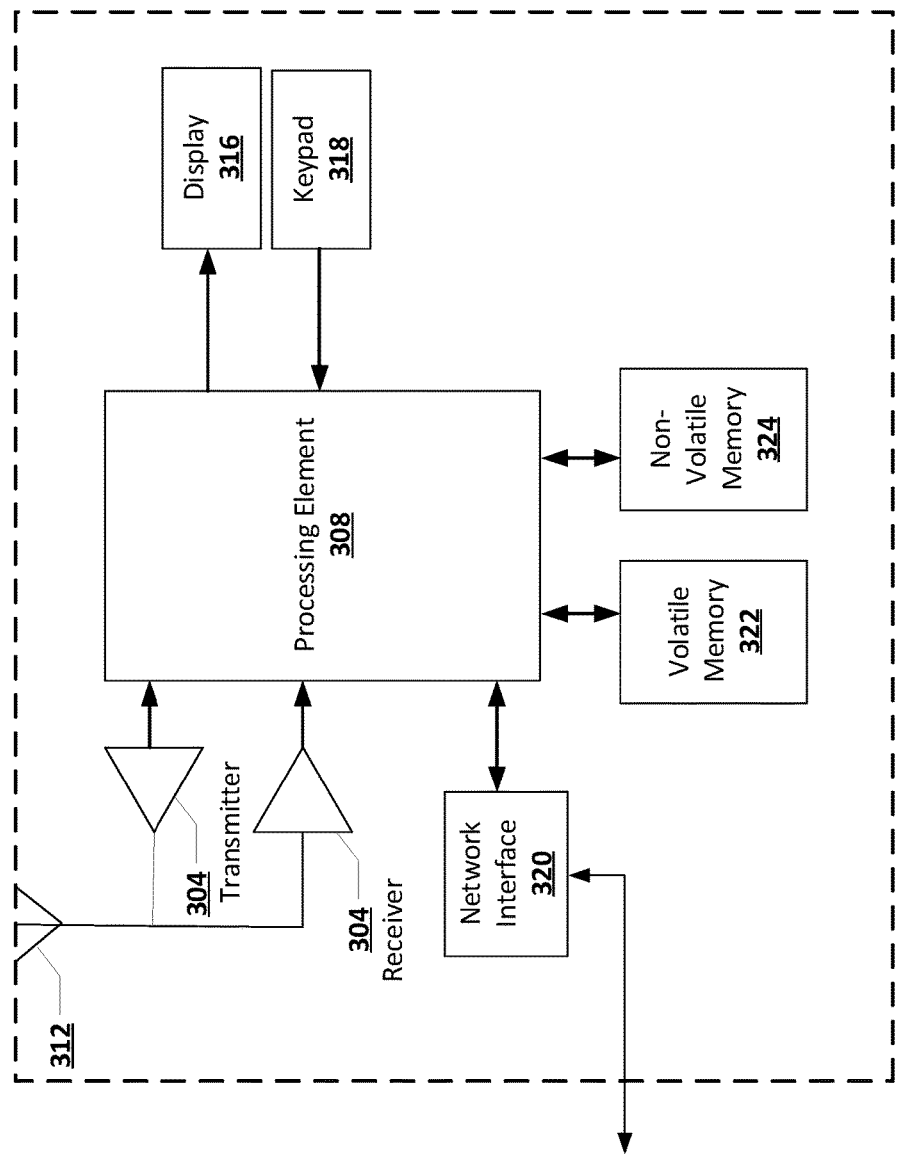

FIG. 3 provides an example client computing entity in accordance with some embodiments discussed herein.

Figure 4:
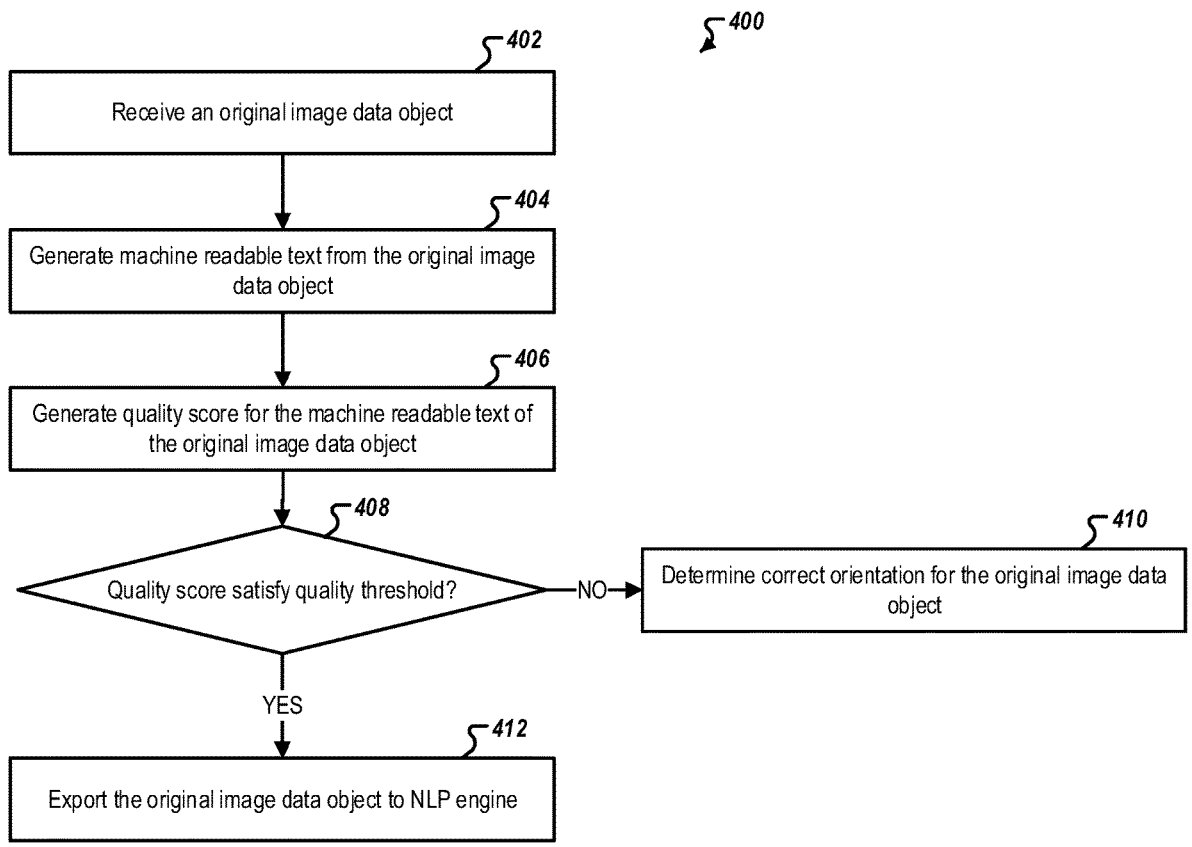

FIG. 4 is a flowchart illustrating example processes for performing OCR processing, quality determination, and rotational correction of an image in accordance with certain embodiments.

Figure 5:
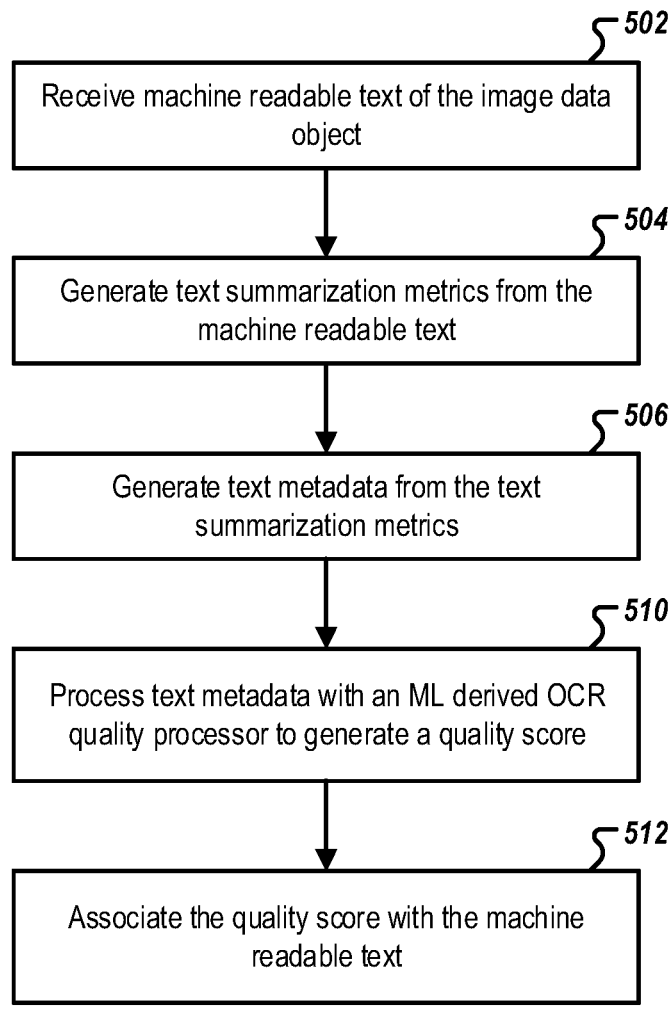

FIG. 5 is a flowchart illustrating example processes for performing OCR quality processing of machine readable text in accordance with certain embodiments.

Figure 6:
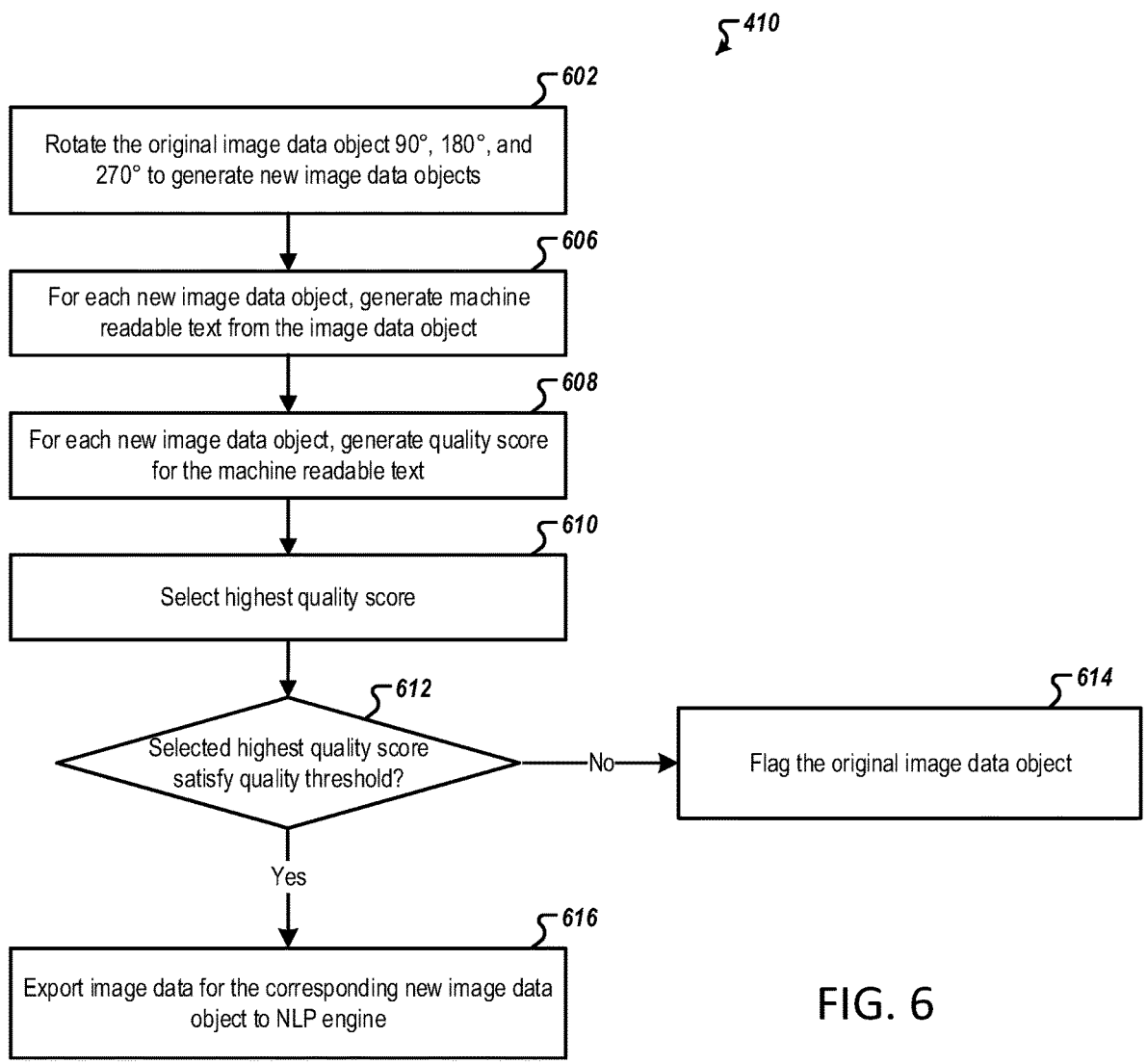

FIG. 6 is a flowchart illustrating example processes for performing rotation analysis on images in accordance with certain embodiments.

Figure 7:
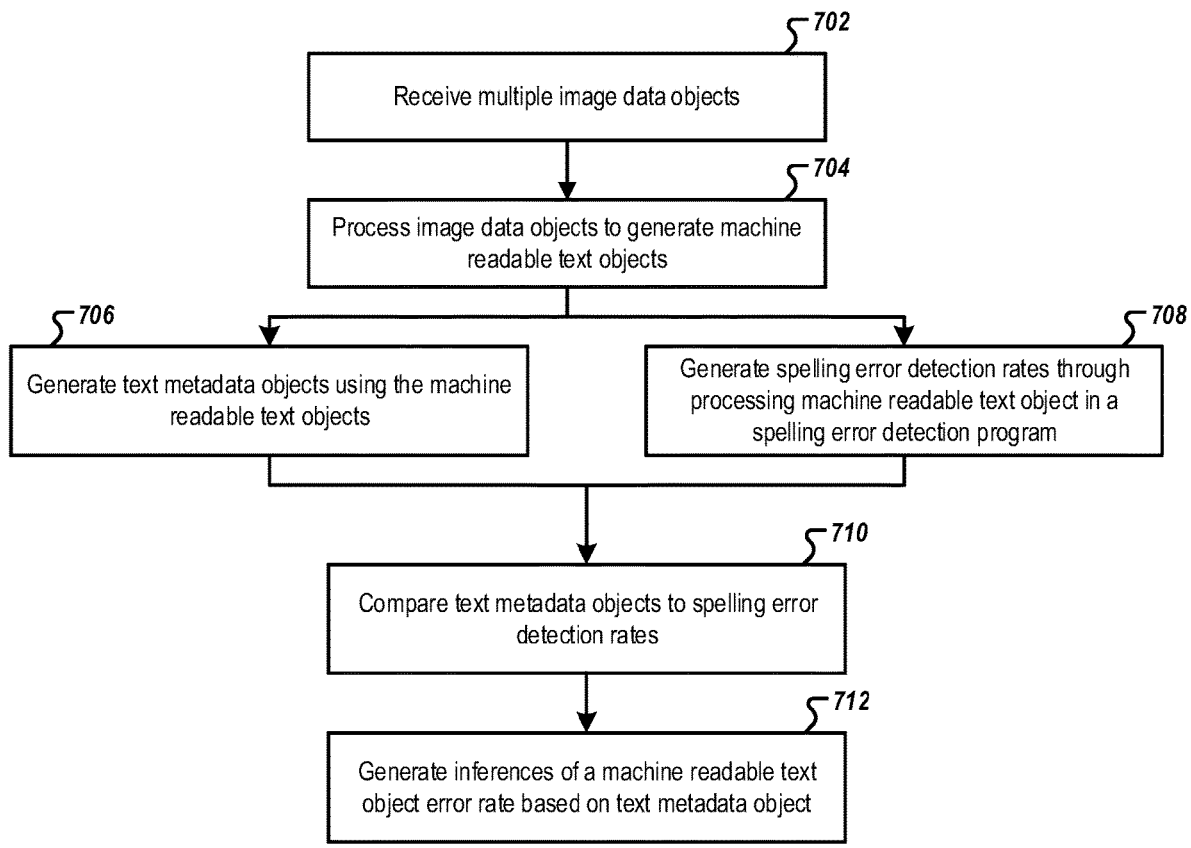

FIG. 7 is a flowchart illustrating example processes for training one or more machine learning models and for determining spell-correction error rates in accordance with certain embodiments.

Figure 8:
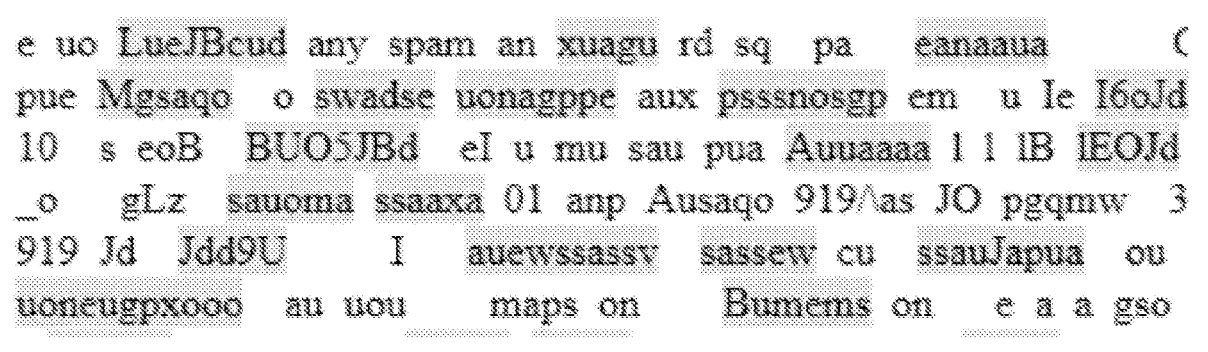

FIG. 8 illustrates an example output from an OCR processor of an image in an incorrect orientation.

DETAILED DESCRIPTION

Various embodiments will now be described more fully hereinafter with reference to the accompanying drawings, in which some, but not all embodiments of the inventions are shown. Indeed, the described configurations may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments are described with reference to predictive data analysis, one of ordinary skill in the art will recognize that the disclosed concepts can be used to perform other types of data analysis.

I. Overview

Various embodiments are configured for providing high-accuracy OCR processing of imaged documents (and/or other images), at least in part by assessing the quality of OCR output based at least in part on text metadata of the machine readable text. The assessed quality of OCR output may be used to determine a better image orientation for more accurate OCR processing in the event the assessed quality of an initial OCR output does not satisfy relevant criteria. Absent this orientation correcting process, processing of documents by OCR engines may result in less accurate machine readable text not be conducive to further processing such as natural language processing. This in turn reduces the overall operational reliability of systems (e.g., natural language processing (NLP) systems) reliant on machine readable text extracted from images, such as document scans, photographs, and/or the like (e.g. medical record storing and tracking). Accordingly, various embodiments are configured to utilize a series of OCR output quality assessments together with image rotation processes to identify a best-quality OCR output corresponding with a particular image rotation. Moreover, various embodiments may flag non-rotational errors that cause poor OCR output allowing for further processing before exporting the machine readable text to other systems.

II. Definitions

The term "medical chart" may refer to a record that contains medical information/data of a patient. It should be understood that a medical chart is just one of a plurality of documents, text-containing images, and/or the like that may be imaged and converted to machine readable text via OCR techniques.

The term "image data object" may refer to a data object storing an image, such as an image of a medical chart. The image data object may be embodied as one or more image data files (e.g., having an extension such as .jpg, .gif, .pdf, .bmp, .tiff, and/or the like) that may be generated based at least in part on a document scan, a photograph, and/or the like.

The term "machine readable text" may refer to text data in a data format that can be automatically read and processed by a computer.

The term "machine readable text object" may refer to a data object in a data format that can be automatically read and processed by a computer. Such machine readable text objects may comprise plaintext data files, metadata accompanying an image, and/or the like.

The term "text summarization metrics" may refer to characteristics of an analyzed grouping of text (e.g., machine readable text within a machine readable text object) such as the count of words not evaluated, count of words evaluated, count of words not found in the dictionary, count of words found in the dictionary, total count of words in the document, and total count of space/whitespace characters contained within the document.

The term "text summarization metrics object" may refer to a data object storing text summarization metrics.

The term "text metadata" may refer to a compilation of various text summarization metrics.

The term "text metadata object" may refer to a data object storing text metadata.

The terms "optical character recognition," "OCR," may refer to a software framework configured for processing an image data object to extract one or more features in the form of machine readable text.

The term "optical character recognition engine" may refer to an OCR-capable processor configuration for converting an image into machine readable text.

The term "OCR quality engine" may refer to a processor configuration for determining the quality score of an OCR generated machine readable text.

The term "rotation analyzer engine" may refer to a processor configuration for determining the proper image rotation (e.g., operating together with the OCR engine and/or OCR quality engine) for optimizing an OCR output quality score.

The term "spelling error" may refer to an error in the machine readable text that may be due to incorrect spelling in the image data object. Spelling errors may be determined at least in part by comparing individual words within machine-readable text to words specifically identified within a dictionary as discussed herein to identify matches. If a match is not identified between the analyzed word and words within the dictionary, but the word is indicated as a likely misspelling of a word existing within the dictionary, the analyzed word may be flagged as a spelling error.

The term "spelling error detection rate" may refer to the rate at which errors in the machine readable text are caused by spelling errors rather than other error types (e.g., rotational errors or other errors identified as words that do not match words within a dictionary and are not indicated as likely misspellings of words within the dictionary that may be automatically corrected).

The term "quality score" may refer to the inferred error rate of an image data object, such errors may be embodied as spelling errors or other error types. The quality score may be indicative of a percentage of words extracted from an image data object that are not flagged as having errors, however it should be understood that the quality score may be indicative of other metrics for evaluating quality of analyses performed for the image data object.

The term "quality threshold" may refer to a user determined level at which the quality score is compared to determine if the document is low or high quality. A quality threshold is just one example of quality criteria that may be utilized for assessing a quality score. It should be understood that a quality threshold may refer to a minimum quality score for establishing the document as a high quality. Alternatively, the quality threshold may refer to a maximum quality score for establishing the document as high quality.

The term "high quality" may refer to an image with a quality score satisfying the quality criteria.

The term "low quality" may refer to an image with a quality score not satisfying than the quality criteria.

The term "proper image rotation" may refer to the orientation at which an image data object has the highest quality score.

The term "non-OCR related error" may refer to an error in the image data object that prevents a high-quality processing of the image and is not caused by the OCR-process.

The term "dictionary" may refer to a collection or list of words that includes their correct spelling. A dictionary may be developed and/or maintained within an OCR engine, a third party dictionary referenced external to the OCR engine, and/or the like.

The term "features" may refer to distinctive attributes of an object.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for image analysis. The architecture 100 includes an image analysis system 101 configured to at least receive an image from the client computing entities 102, process the image to generate machine readable text, generate text metadata, process the text metadata to generate a quality score, and/or perform prediction-based actions based at least in part on the generated predictive quality score.

In some embodiments, the image analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), and/or the like, as well as any hardware, software and/or firmware required to implement it (such as, e.g., network routers, and/or the like).

The image analysis system 101 may include an image orientation analysis processing entity 106 and a storage subsystem 108. The image orientation analysis processing entity 106 may be configured to perform a variety of image orientation predictive analysis operations, such as OCR quality processor operations and rotation analyzer operations.

The image orientation analysis processing entity 106 may include an optical character recognition engine 111, an OCR quality engine 112, and a rotational analyzer engine 113. Aspects of the optical character recognition engine 111, the OCR quality engine 112 and the rotational analyzer engine 113 are discussed below with reference to FIGS. 4-8.

The storage subsystem 108 may be configured to store at least a portion of input data together with data generated by one or more engines of the image orientation analysis processing entity 106 (e.g. images, machine readable text, text metadata, quality scores, and/or the like) generated and/or utilized by the image orientation analysis processing entity 106 to generate a higher quality image orientation for OCR processing.

The storage subsystem 108 may include one or more storage units, such as multiple distributed storage units that are connected through a computer network. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Image Orientation Analysis Processing Entity

FIG. 2 provides a schematic of an image orientation analysis processing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the image orientation analysis processing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the image orientation analysis processing entity 106 may include or be in communication with one or more processing elements 205 (also referred to as processors, processing circuitry, and/or similar terms used herein interchangeably) that communicate with other elements within the image orientation analysis processing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the image orientation analysis processing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, image orientation analysis processing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the image orientation analysis processing entity 106 with the assistance of the processing element 205 and operating system.

As indicated, in one embodiment, the image orientation analysis processing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, image orientation analysis processing entity 106 may be configured to communicate via wireless client communication networks using any of a variety of protocols, such as general packet radio service (GRPS), Universal Mobile Telecommunications System (UMTS), Code Division Multiple Access 1900 (CDMA1900), CDMA1900 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the image orientation analysis processing entity 106 may include or be in communication with one or more input elements, such as a keyboard input, a mouse input, a touch screen/display input, motion input, movement input, audio input, pointing device input, joystick input, keypad input, and/or the like. The image orientation analysis processing entity 106 may also include or be in communication with one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the image orientation analysis processing entity 106. In a particular embodiment, the client computing entity 102 may operate in accordance with multiple wireless communication standards and protocols, such as UMTS, CDMA1900, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the image orientation analysis processing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the image orientation analysis processing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the image orientation analysis processing entity 106 and/or various other computing entities.

In another embodiment, the client computing entity 102 may include one or more components or functionality that are the same or similar to those of the image orientation analysis processing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Technical Challenges and Technical Solutions

Embodiments as discussed herein solve various technical challenges, including addressing "rotation error detection" and "error validation" problems associated with automated extraction of textual data from image data objects. The "rotation error detection" may impede or prevent automated OCR of certain images if those images are not properly oriented (e.g., such that the OCR engine is presented with letters in their proper orientation, thereby enabling the OCR engine to appropriately identify each letter—and to consequently recognize each word within the image. By identifying the presence, absence, or degree of rotation error detection based at least in part on data generated through the execution of an OCR process, various embodiments minimize computational resource usage associated with extracting textual data from a plurality of image data objects, as only a subset of the image data objects are subject to inappropriate image rotation that would require image rotation and multiple OCR-based textual extraction processes. By contrast, systems and methods configured for simultaneous or original image orientation analysis concurrent with or prior to initial OCR processes result in a large computational resource expenditure on all image data objects, including those for which computationally expensive rotational image analysis is not necessary. As input batches grow larger, processing resource savings increase as the quantity of image data objects not requiring image rotation increases. Certain embodiments enable post-hoc analysis of the OCR output through analyzing text metadata, thereby enabling identification of a subset of image data objects requiring additional processing, without unnecessarily utilizing significant processing resources performing additional image processing for those images not requiring further processing. Moreover, "error validation" processes of certain embodiments are configured for automatically identifying OCR processing errors that result in poor-quality machine readable text due to non-rotation-based imaging errors (e.g., spelling errors, transcription errors, and/or the like, such as errors that are traditionally only identifiable manually).

As noted above, embodiments as discussed herein provide technical solutions to technical problems related to the OCR processing of an image. In particular, the ratio of incorrect words identifiable through a spell check program to words not found in the dictionary can be quickly predicted with 97% correlation using previously generated OCR data. This enables certain embodiments to infer text summarization metrics without performing costly spellcheck processing. Moreover, a high ratio of incorrect words that are not recognized by a spell check program may be utilized to identify an improper orientation of the image, leading to rotational issues with OCR data. Such a ratio may be identified within generated text summarization metrics. Thus, text summarization metrics that are contained in text metadata may be used to predict rotational issues (e.g., an incorrect image orientation) with OCR data while avoiding computationally costly processing. Moreover, text metadata may be extracted and analyzed asynchronously, thereby enabling asynchronous identification of rotational issues downstream from OCR processing services. Further, the utilization of text metadata enables differing error types to be automatically distinguished (such as rotational errors, image quality errors, transcription errors, and/or the like. Embodiments as discussed herein therefore overcome the technical problems of rotation error detection and error validation.

VI. Exemplary System Operations

FIG. 4 is a flowchart diagram of an example process 400 for performing image orientation analysis. Via the various steps/operations of the process 400, the image orientation analysis processing entity 106 can efficiently and effectively perform image orientation analyses using text metadata that is generated using outputs of an OCR processor, which in turn eliminates the need for performing resource-intensive machine vision diagnostics to perform orientation analysis.

The process 400 begins at step/operation 402 when the image orientation analysis processing entity 106 receives an original image data object that contains text to be converted into machine readable text. This original image data object may comprise one or more images, each image being embodied as at least a portion of an image data file. For example, the original image data may be an image of various types of documents such as a medical chart. In some embodiments, an imaging device (e.g., an optical scanner, a camera, and/or the like) or other computing entity will provide the image data object in a digital format (e.g. JPEG, PNG, RAW, PDF, and/or the like). In some embodiments, the image orientation analysis processing entity 106 receives a batch of original image data objects (e.g., a plurality of original image data objects) for processing. It should be understood that the image orientation analysis processing entity 106 may receive original image data objects in a batch fashion as discussed above (e.g., periodically, at defined time intervals, and/or the like). In other embodiments, the image orientation analysis processing entity 106 may receive original image data objects continuously and/or in real-time, for example, as the imaging device generates the original image data objects.

In some embodiments, as illustrated at step/operation 404, an OCR engine 111 of the image orientation analysis processing entity 106 generates machine readable text from the original image data object. In some embodiments, processes for generating the machine readable text may comprise preprocessing the image to increase the accuracy of results generated by the OCR engine 111. Preprocessing may comprise processes for increasing image contrast, generating a black and white version of the image of the original image data object, removing the alpha channel of the image of the original image data object (e.g., by applying an image mask and/or by converting the original image data object to a JPEG format), altering the settings of the OCR engine 111 to match the language and/or type of document (e.g., by utilizing metadata stored in association with the original image data object indicative of a language associated with the original image data object and retrieving an appropriate language-specific dictionary (e.g., stored in memory) for usage in identifying words within the OCR-generated data, by utilizing metadata stored in association with the original image data object to identify a document type associated with the original image data object and retrieving an appropriate document type-specific dictionary (e.g., stored in memory) for usage in identifying words within the OCR-generated data, and/or the like) and setting the correct page segmentation mode of the OCR engine 111. Once the preprocessing has been completed, outlines of text components (e.g., defining a bounded area within which text for analysis is located) may be compiled for processing groups before being segmented into text lines and regions (e.g., the text line and/or regions may identify individual bounded areas corresponding to individual lines within multi-line regions of text). Next, the OCR engine 111 may segment the grouped text into words (e.g., by identifying white spaces between/within identified text that are identified as being gaps between individual words, such as by utilizing white space-specific size thresholds, white space-specific size percentages compared to adjacent identified letters, and/or the like) before attempting to recognize the individual characters in each word. Those words may be recognized and identified as tokens that may be utilized for further data evaluation. Certain characters identified within early portions of an image may be recognized by an adaptive classifier and utilized to facilitate identification of similar characters later in the document (e.g., such that characters of the same font may be easily recognized). The characters may then be compiled into one machine readable text object. This machine readable text object may comprise a compilation of individual characters in a language (e.g. the modern English language). In some embodiments, this OCR engine 111 may be an engine such as a Tesseract OCR engine, although other OCR engines may be utilized in certain embodiments, such as an Azure Cognitive Services (ACS) OCR engine executing within a cloud-based computing environment, and/or the like. The machine readable text can be stored in a machine readable text object. In certain embodiments, the OCR process may be an iterative process, with each iteration utilizing increasingly more processing resources so as to minimize the amount of processing resources expended to recognize relatively easy-to-recognize words (identified during an initial pass), while reserving additional processing resources for obscured or otherwise difficult-to-recognize words (identified during a second or subsequent pass, which may benefit from additional data provided to the adaptive classifier to more accurately identify characters during subsequent passes). Moreover, certain embodiments may utilize additional processing resources to check for special character types, such as small-caps, such as by analyzing character heights.

At step/operation 406, the OCR quality engine 112 generates a quality score for the machine readable text, for example, via a machine-learning based scoring model, via a rule-based scoring model, and/or the like. The quality score may be provided as a percentage (e.g., indicative of whether errors within the machine readable text are attributable solely to an incorrect image orientation, or to some other non-orientation based errors; indicative of the percentage of detected errors attributable solely to an incorrect image orientation, and/or the like). In certain embodiments, the quality score may be established utilizing a rule-based scoring model configured to assign/adjust a quality score based at least in part on detected aspects of the metadata associated with an image. In other embodiments, the quality score may be provided as an integer, or any other format enabling direct comparison between quality scores. Quality score criteria as discussed herein may be provided with corresponding configurations (e.g., as a minimum percentage, as a minimum integer, as a maximum percentage, as a maximum integer, and/or the like) based on the configurations of the quality score. In some embodiments, step/operation 406 may be performed in accordance with the process depicted in FIG. 5. The process depicted in FIG. 5 begins at step/operation 502 when the OCR quality engine 112 receives the machine readable text of the image data object.

At step/operation 502, the OCR quality engine 112 receives machine readable text associated with an original image data object. As discussed above, such machine readable text may be generated via OCR processing methodologies as discussed herein.

At step/operation 504, the OCR quality engine 112 generates text summarization metrics from the machine readable text. As an example, these metrics may include a count of words not evaluated. These words may not have been evaluated by the OCR engine 111 due to the word being too short, being a numeric character, being incorrectly positioned relative to other words (e.g., being within a header or footer of an image document, being within an inset image within the imaged document, and/or the like), and/or the like. As another example, these metrics may include a count of words not found in the dictionary utilized for OCR image analysis (as discussed above, the dictionary may be selected to facilitate evaluation of a particular document using an appropriate language and/or document-type specific word set). As an example, the words from the machine readable text may be evaluated against a predefined dictionary of English words with supplemental terms according to a determined document type (e.g., a particular medical record type, a particular lab report type, and/or the like). Further examples of potential text summarization metrics may include metrics such as count of words evaluated, count of words found in the dictionary, count of words not found in the dictionary, total count of words in the document, and total count of space/whitespace characters contained in the document. Further, certain embodiments may be configured to predict the ratio of incorrect words with a spell check program to words not found in the dictionary as an additional text summarization metric. The OCR quality engine 112 compiles these text summarization metrics into a text metadata object 506.

In some embodiments, step/operation 510 may be performed in accordance with a machine-learning model trained in accordance with various process steps/operations depicted in FIG. 7. The process depicted in FIG. 7 begins at step/operation 702 when, in some embodiments, a machine learning engine receives a plurality of image data objects.

At step/operation 704 an OCR engine 111 generates machine readable text objects.

At step/operation 706, the image analysis system 101 generates text summarization metrics from the machine readable text. As an example, these metrics may include count of words not evaluated. These words may not have been evaluated by the OCR engine 111 due to the word being too short, being a numeric character, or due to positional issues such as text being in a portion of the image data object not subject to image analysis (e.g., a header/footer, an inset image, and/or the like). As another example, these metrics may include the count of words not found in the dictionary. In some embodiments, the words from the machine readable text may be evaluated against a predefined dictionary of English words with supplemental terms according to a document type for which the analysis is performed. Further examples of potential text summarization metrics may include metrics such as count of words evaluated, count of words found in the dictionary, count of words not found in the dictionary, total count of words in the document, total count of space/whitespace characters contained in the document, and/or the like. Further, some embodiments of the present invention may be configured to predict the ratio of incorrect words with a spell check program to words not found in the dictionary as an additional text summarization metric. The OCR quality engine 112 compiles these text summarization metrics into a text metadata object to be associated with the machine-readable text data object and/or the image data object. In certain embodiments, the OCR quality engine 112 may provide an output that may be provided to a client computing entity 102 comprising the image data object and/or comprising data indicative of an automatically detected error rate. The output may be provided to enable a user to manually check the results of the OCR quality engine 112, and the output may be provided as a part of a user interface configured to receive user input indicative of additional corrections, comments, and/or the like provided by the user. Such user input may be utilized as a part of training data (together with the image data object) as discussed herein for training the OCR quality engine 112.

At step/operation 708, the image analysis system 101 generates a spelling error detection rate. In certain embodiments, the generation of a spelling error detection rate may be executed through processing the machine readable text object in a spelling error detection program, such as by comparing words identified within the machine readable text object to words stored in the dictionary to identify words not matching words within the dictionary. This program may then determine the number of words not found in the dictionary that could not be fixed through spelling correction methods. For example, spelling correction methods may comprise correlating common misspellings with likely intended words, as indicated within the dictionary, such as correlating "teh" with a likely intended spelling of "the." Words indicated as not having a likely intended spelling, such as "rewsxdgggtes," may be indicated as incorrect words without a likely intended correct spelling, which may be indicative of non-spelling related errors.

At step/operation 710, the image analysis system 101 compares the chart metadata objects to the spelling error detection rates to look for patterns in the text summarization metrics and spelling error detection rates.

At step/operation 712, a machine-learning model is configured to generate inferences of machine readable text quality based on text metadata. In some embodiments, this is based on the assumption that a low-quality OCR result has a large portion of words that are not in the dictionary and are not merely spelling errors that may be fixed by a spelling error detection program. In some embodiments, this model is built using a machine learning algorithm utilizing the text metadata object as the input and a quality score as the output. As just one example, the machine-learning model may be implemented as an ensemble model comprising a random forest model and a boosted tree model collectively configured to determine the quality score. Such an embodiment is configured to utilize the text metadata to generate a prediction of an error rate ratio, and the generated prediction of the error rate ratio may be utilized as the quality score. The predicted error rate ratio of certain embodiments is indicative of a ratio between predicted number of words that cannot be automatically corrected by a spell correction program (non-spelling errors) and the number of words not found in the dictionary (total errors). Accordingly, a higher predicted error rate is indicative of a higher quantity of misspelled words, which may be indicative of an incorrect document orientation. It should be understood that other machine-learning based models may be utilized in other embodiments.

At step/operation 408, the image orientation analysis processing entity 106 determines if the quality score generated by the OCR quality engine 112 satisfies one or more quality criteria, such as a score threshold. In some embodiments, if the quality score does satisfy the quality threshold then the machine readable text and original image may be exported to a natural language processing (NLP) engine for additional processing, such as to identify context or substance of the data (e.g., for categorizing documents, for extracting specific words, for routing the documents based on text content, and/or the like). In some embodiments, if the quality score does not satisfy the quality threshold the original image may be exported to a rotational analyzer engine 113 to determine the correct orientation for the original image data object 410.

The rotational analyzer engine 113 may operate in accordance with the example process of FIG. 6. At step/operation 602, the rotational analyzer engine 113 receives the original image data object, and rotates the original image data object and creates a plurality (e.g., three) new image data objects each corresponding to a different rotational position (such that each new image data object comprises the original image data object rotated to a corresponding rotational position). As an example, the rotational analyzer engine 113 rotates the original image data object 90° to generate a first image data object at a first rotational position, 180° to generate a second image data object at a second rotational position, and 270° to generate a third image data object at a third rotational position and generates and stores new image data objects reflective of the image data object rotated at each of these rotational positions. It should be understood that other/additional rotational positions may be utilized in certain embodiments to generate more/fewer image data objects for further analysis.

At step/operation 606, the OCR engine 111 generates machine readable text for each of the new image data objects, in a manner as discussed above in reference to step/operation 404 of FIG. 4.

At step/operation 608, the OCR quality engine 112 generates a quality score for each of the machine readable text data objects, in a manner as discussed above in reference to step/operation 406 of FIG. 4 (and the process illustrated in FIG. 5).

At step/operation 610, an optimal quality score (e.g., the highest quality score) from among the new image data objects is selected. The optimal quality score may be indicative of a proper image orientation for further analysis, as the OCR processes executed for the image data object having the optimal quality score (e.g., the image data object generated based at least in part on a rotation of the original image data object) determines that the fewest misspelled words (or words for which there is not a likely intended corresponding word) are included within the text data object generated for the image data object. The new image data object corresponding to the rotational position having the optimal quality score may be further checked to ensure that the new image data object identified as having the optimal quality score is further characterized by a decrease in the number of errors associated with the OCR-generated text of the new image data, as compared with the original image data object.

At step/operation 612, the image analysis system 101 determines if the quality score selected at step/operation 610 satisfies one or more quality criteria. In some embodiments, this criteria may be defined as the quality score being at least a defined score level higher than the quality score for the original image data object (e.g., at least 1.5× the original quality score, at least 2× the original quality score, and/or the like). In some embodiments, if the quality score does satisfy the quality criteria then the machine readable text data object and selected new image data object may be exported to an NLP engine for further processing. In some embodiments, if the quality score does not satisfy the quality criteria the original image data object is flagged as having a non-OCR error 614. In certain embodiments, an alert may be generated for a user to manually review the original image data object. As just one example, the image orientation analysis processing entity 106 may be configured to periodically (e.g., at defined intervals) generate a manual review data object comprising a plurality of original image data objects for which manual review is determined to be necessary to extract textual data therefrom.

In some embodiments, the generated machine readable text data objects (an example of which is shown in FIG. 8), the selected image data object generated at least in part by rotating the original image data object, the original image data object, and/or metadata stored therewith may be populated into a labeled dataset used to train a machine learning model to detect correct page orientation based on originally generated machine readable text. By placing these data objects into the labeled data set to be utilized as training data, the image orientation analysis processing entity 106 may be configured to detect to a particular preferred image orientation. As just one example, the image orientation analysis processing entity 106 may be configured to utilize data indicative of known letter shapes and orientations (e.g., such data may indicate that an "M" has a shape of "Σ" when rotated 90 degrees and a shape of "W" when rotated 180 degrees) so as to compare relative orientations of documents represented within the image data objects. It should be understood that other features within an image may be utilized as references for determining an image orientation within each rotated image data object). Utilizing the training data to refine the machine learning models to predict a preferred image orientation for particular images may further reduce the computational processing resources utilized for automatically generating OCR-based machine readable text for particular images determined to be improperly rotated within the original image data object. For example, certain embodiments may be configured to utilize a machine-learning based model to identify one or more predicted image orientations, so as to reduce the total number of rotated image data objects generated upon initiation of a process for generating one or more rotated image data objects for identifying an appropriate orientation of the image data object for automatically generating machine readable text data objects via OCR techniques to be associated with the original image data object. It should be further understood that in certain embodiments, a separate set of training data may be similarly processed to generate training data. Overall, the training data may comprise supervised training data, with classification metadata associated with individual training data entries indicating whether the resulting OCR generated text data object is considered a low quality OCR result or a high quality OCR result. Moreover, individual training data entries may be associated with metadata indicative of a quality score, which itself may be indicative of a predicted error rate, such as a spelling error detection rate indicative of a percentage of words identified within the text data object that are identified as incorrectly spelled and capable of correction (e.g., by matching with correctly spelled words existing within a dictionary) relative to the number of incorrectly spelled words not capable of automated correction utilized during OCR. Data indicative of the error rate, quality score, and/or classification data may be utilized to establish quality criteria that may be implemented by a machine learning model to facilitate identification of text based data objects (and their corresponding image data objects) having a sufficiently high quality OCR result to warrant further analysis (e.g., via natural language processing (NLP) systems as discussed herein).

Moreover, the labeled dataset discussed above, including the highest quality score new image data object may be further utilized to detect non-rotational OCR issues based on text metadata. In certain embodiments, the training data set may be further supplemented with manually generated data (e.g., data generated based at least in part on user input received from a client computing entity 102 during a manual review of a particular image data object), for example, identifying one or more non-rotational based OCR issues via manual tagging. It should be understood that non-rotational based OCR issues may be identified via any of a variety of mechanisms, such as those automated mechanisms discussed herein. By utilizing the training data set to train one or more machine learning models to identify non-rotational based OCR issues, the machine learning model may be configured to more precisely and accurately identify those non-rotational based OCR issues, and/or to correlate remedial actions that may be provided to address the identified non-rotational based OCR issues. As an example of such remedial actions, one or more incorrectly spelled words may be manually correlated to an intended spelling, and data indicative of this correlation may be stored and later utilized for addressing incorrectly spelled words in later provided documents. It should be understood that any of a variety of remedial actions may be identified and/or provided in certain embodiments, thereby enabling the image analysis system 101 to apply such remedial actions based on machine-learning model application to identify appropriate non-rotational OCR issues for addressing via the one or more remedial actions.

VII. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
providing, by one or more processors, a first rotated machine readable text data object of a plurality of rotated machine readable text data objects to a natural language processing (NLP) engine, wherein the first rotated machine readable text data object is generated by:
  (a) generating, by applying an optical character recognition (OCR) process, initial machine readable text for an original image data object,

(b) generating, using one or more machine learning models, an initial quality score for the initial machine readable text, wherein the initial quality score indicates a probability that an error in the initial machine readable text is attributable to an image orientation associated with the original image data object, (c) responsive to a determination that the initial quality score does not satisfy one or more quality criteria, generating a plurality of rotated image data objects, wherein (i) each of the plurality of rotated image data objects corresponds to a different rotational position and (ii) each of the plurality of rotated image data objects comprises the original image data object rotated to a corresponding rotational position, (d) generating the plurality of rotated machine readable text data objects for the plurality of rotated image data objects, (e) generating, using one or more machine learning models, a plurality of rotated quality scores comprising a rotated quality score for each of the plurality of rotated machine readable text data objects, and (f) determining that a first rotated quality score of the plurality of rotated quality scores satisfies the one or more quality criteria, wherein (i) the first rotated quality score corresponds to the first rotated machine readable text data object and (ii) determining that the first rotated quality score satisfies the one or more quality criteria indicates that the first rotated machine readable text data object is to be provided to the NLP engine.

2. The computer-implemented method of claim 1, wherein generating the initial quality score comprises:
identifying one or more words within the initial machine readable text based at least in part on a machine-learning model for identifying spaces between words;
comparing each of the one or more words identified within the initial machine readable text against words within a dictionary retrieved for checking spelling within the initial machine readable text;
generating a spelling error detection rate for the initial machine readable text; and
determining the initial quality score based at least in part on the spelling error detection rate for the initial machine readable text.

3. The computer-implemented method of claim 2, further comprising:
identifying, within metadata associated with the original image data object, a language associated with the original image data object; and
retrieving the dictionary based at least in part on the language associated with the original image data object.

4. The computer-implemented method of claim 1, wherein generating the plurality of rotated image data objects comprises:
generating a first rotated image data object comprising the original image data object rotated to a first rotational position;
generating a second rotated image data object comprising the original image data object rotated to a second rotational position;
generating a third rotated image data object comprising the original image data object rotated to a third rotational position; and
storing each of the first rotated image data object, the second rotated image data object, and the third rotated image data object in association with the original image data object.

5. The computer-implemented method of claim 1, wherein generating the initial quality score for the initial machine readable text comprises:
generating text metadata comprising text summarization metrics for the initial machine readable text; and
processing the text metadata using one or more machine learning models to generate the initial quality score and associating the initial quality score with the initial machine readable text.

6. The computer-implemented method of claim 5, wherein the text summarization metrics comprise at least one of:
a count of words not evaluated within the initial machine readable text,
a count of words evaluated within the initial machine readable text,
a count of words within the initial machine readable text not found in a dictionary,
a count of words within the initial machine readable text found in the dictionary,
a count of words within the initial machine readable text, or
a count of space characters within the initial machine readable text.

7. A computing apparatus comprising memory and one or more processors communicatively coupled to the memory, the one or more processors configured to:
provide a first rotated machine readable text data object of a plurality of rotated machine readable text data objects to a natural language processing (NLP) engine, wherein the first rotated machine readable text data object is generated by:
(a) generating, by applying an optical character recognition (OCR) process, initial machine readable text for an original image data object,
(b) generating, using one or more machine learning models, an initial quality score for the initial machine readable text, wherein the initial quality score indicates a probability that an error in the initial machine readable text is attributable to an image orientation associated with the original image data object,
(c) responsive to a determination that the initial quality score does not satisfy one or more quality criteria, generating a plurality of rotated image data objects, wherein (i) each of the plurality of rotated image data objects corresponds to a different rotational position and (ii) each of the plurality of rotated image data objects comprises the original image data object rotated to a corresponding rotational position,
(d) generating the plurality of rotated machine readable text data objects for the plurality of rotated image data objects,
(e) generating, using one or more machine learning models, a plurality of rotated quality scores comprising a rotated quality score for each of the plurality of rotated machine readable text data objects, and
(f) determining that a first rotated quality score of the plurality of rotated quality scores satisfies the one or more quality criteria, wherein (i) the first rotated quality score corresponds to the first rotated machine readable text data object and (ii) determining that the first rotated quality score satisfies the one or more quality criteria indicates that the first rotated machine readable text data object is to be provided to the NLP engine.

8. The computing apparatus of claim 7, wherein generating the initial quality score comprises:
identifying one or more words within the initial machine readable text based at least in part on a machine-learning model for identifying spaces between words;
comparing each of the one or more words identified within the initial machine readable text against words within a dictionary retrieved for checking spelling within the initial machine readable text;
generating a spelling error detection rate for the initial machine readable text; and
determining the initial quality score based at least in part on the spelling error detection rate for the initial machine readable text.

9. The computing apparatus of claim 8, wherein the one or more processors are further configured to:
identify, within metadata associated with the original image data object, a language associated with the original image data object; and
retrieve the dictionary based at least in part on the language associated with the original image data object.

10. The computing apparatus of claim 7, wherein generating a plurality of rotated image data objects comprises:
generating a first rotated image data object comprising the original image data object rotated to a first rotational position;
generating a second rotated image data object comprising the original image data object rotated to a second rotational position;
generating a third rotated image data object comprising the original image data object rotated to a third rotational position; and
storing each of the first rotated image data object, the second rotated image data object, and the third rotated image data object in association with the original image data object.

11. The computing apparatus of claim 7, wherein generating an initial quality score for the initial machine readable text comprises:
generating text metadata comprising text summarization metrics for the initial machine readable text; and
processing the text metadata using one or more machine learning models to generate the initial quality score and associating the initial quality score with the initial machine readable text.

12. The computing apparatus of claim 11, wherein the text summarization metrics comprise at least one of:
a count of words not evaluated within the initial machine readable text,
a count of words evaluated within the initial machine readable text,
a count of words within the initial machine readable text not found in a dictionary,
a count of words within the initial machine readable text found in the dictionary,
a count of words within the initial machine readable text, or
a count of space characters within the initial machine readable text.

13. One or more non-transitory computer-readable storage media including instructions that, when executed by one or more processors, cause the one or more processors to: provide a first rotated machine readable text data object of a plurality of rotated machine readable text data objects to a natural language processing (NLP) engine, wherein the first rotated machine readable text data object is generated by:
(a) generating, by applying an optical character recognition (OCR) process, initial machine readable text for an original image data object,
(b) generating, using one or more machine learning models, an initial quality score for the initial machine readable text, wherein the initial quality score indicates a probability that an error in the initial machine readable text is attributable to an image orientation associated with the original image data object,
(c) responsive to a determination that the initial quality score does not satisfy one or more quality criteria, generating a plurality of rotated image data objects, wherein (i) each of the plurality of rotated image data objects corresponds to a different rotational position and (ii) each of the plurality of rotated image data objects comprises the original image data object rotated to a corresponding rotational position,
(d) generating the plurality of rotated machine readable text data objects for the plurality of rotated image data objects,
(e) generating, using one or more machine learning models, a plurality of rotated quality scores comprising a rotated quality score for each of the plurality of rotated machine readable text data objects, and
(f) determining that a first rotated quality score of the plurality of rotated quality scores satisfies the one or more quality criteria, wherein (i) the first rotated quality score corresponds to the first rotated machine readable text data object and (ii) determining that the first rotated quality score satisfies the one or more quality criteria indicates that the first rotated machine readable text data object is to be provided to the NLP engine.

14. The one or more non-transitory computer-readable storage media of claim 13, wherein generating the initial quality score comprises:
identifying one or more words within the initial machine readable text based at least in part on a machine-learning model for identifying spaces between words;
comparing each of the one or more words identified within the initial machine readable text against words within a dictionary retrieved for checking spelling within the initial machine readable text;
generating a spelling error detection rate for the initial machine readable text; and
determining the initial quality score based at least in part on the spelling error detection rate for the initial machine readable text.

15. The one or more non-transitory computer-readable storage media of claim 14, wherein the instructions further cause the one or more processors to:
identify, within metadata associated with the original image data object, a language associated with the original image data object; and
retrieve the dictionary based at least in part on the language associated with the original image data object.

16. The one or more non-transitory computer-readable storage media of claim 13, wherein generating the plurality of rotated image data objects comprises:

generating a first rotated image data object comprising the original image data object rotated to a first rotational position;

generating a second rotated image data object comprising the original image data object rotated to a second rotational position;

generating a third rotated image data object comprising the original image data object rotated to a third rotational position; and storing each of the first rotated image data object, the second rotated image data object, and the third rotated image data object in association with the original image data object.

17. The one or more non-transitory computer-readable storage media of claim 13, wherein generating the initial quality score for the initial machine readable text comprises:

generating text metadata comprising text summarization metrics for the initial machine readable text; and processing the text metadata using one or more machine learning models to generate the initial quality score and associating the initial quality score with the initial machine readable text.

18. The one or more non-transitory computer-readable storage media of claim 17, wherein the text summarization metrics comprise at least one of:

a count of words not evaluated within the initial machine readable text, a count of words evaluated within the initial machine readable text, a count of words within the initial machine readable text not found in a dictionary, a count of words within the initial machine readable text found in the dictionary, a count of words within the initial machine readable text, or a count of space characters within the initial machine readable text.

* * * * *